United States Patent
Chikazawa

(10) Patent No.: US 9,073,578 B2
(45) Date of Patent: Jul. 7, 2015

(54) VEHICLE UNDERBODY STRUCTURE

(75) Inventor: Ryosuke Chikazawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 13/699,338

(22) PCT Filed: Aug. 15, 2011

(86) PCT No.: PCT/JP2011/068531
§ 371 (c)(1),
(2), (4) Date: Nov. 21, 2012

(87) PCT Pub. No.: WO2013/024528
PCT Pub. Date: Feb. 21, 2013

(65) Prior Publication Data
US 2014/0183905 A1    Jul. 3, 2014

(51) Int. Cl.
*B62D 21/06* (2006.01)
*B62D 21/15* (2006.01)
*B62D 25/20* (2006.01)

(52) U.S. Cl.
CPC .............. *B62D 21/06* (2013.01); *B62D 21/155* (2013.01); *B62D 25/2018* (2013.01); *B60Y 2410/122* (2013.01)

(58) Field of Classification Search
CPC .................................. B62D 21/06; B62D 25/20
USPC .......... 280/784, 794; 296/30, 187.08, 193.07, 296/204, 187.09, 187.1, 203.01
See application file for complete search history.

(56) References Cited

U.S. PATENT DOCUMENTS

| | | | |
|---|---|---|---|
| 5,803,533 A * | 9/1998 | Schulz et al. | 296/204 |
| 7,252,326 B2 * | 8/2007 | Wada | 296/204 |
| 7,270,369 B2 * | 9/2007 | Okana et al. | 296/204 |
| 7,552,963 B2 * | 6/2009 | Yamaguchi et al. | 296/187.08 |
| 7,648,195 B2 * | 1/2010 | Stock-Hausen-Petersen et al. | 296/204 |
| 7,798,564 B2 * | 9/2010 | Doi et al. | 296/193.07 |
| 7,883,113 B2 * | 2/2011 | Yatsuda | 280/784 |
| 7,905,503 B2 * | 3/2011 | Goto et al. | 280/124.109 |
| 8,011,695 B2 * | 9/2011 | Kosaka et al. | 280/784 |

(Continued)

FOREIGN PATENT DOCUMENTS

DE 102011015624 A1 * 11/2011 ........... B62D 21/02
JP 60047769 A * 3/1985 ........... B62D 25/20

(Continued)

*Primary Examiner* — Glenn Dayoan
*Assistant Examiner* — Paul Chenevert
(74) *Attorney, Agent, or Firm* — Oliff PLC

(57) ABSTRACT

A vehicle underbody structure capable of maintaining coupling between a brace and a floor frame against a load transmitted from the front side through the brace is provided, even without making a mechanical strength of a coupling portion between the brace and the floor frames particularly high. A brace is provided with a front-side coupling member and a rear-side coupling member, and the front-side coupling member and the rear-side coupling member are connected together by a load transmission section that is substantially M-shaped in plan view. The rear-side coupling member is connected to outside load transmission members of the load transmission section further to a left-right direction central side than a coupling portion of the rear-side coupling member to each floor frame. A load transmitted to the rear-side coupling member accordingly attempts to deform the rear-side coupling member about a rear end portion of the outside load transmission members.

6 Claims, 7 Drawing Sheets

(56) References Cited

U.S. PATENT DOCUMENTS

| | | | |
|---|---|---|---|
| 8,408,566 B2 * | 4/2013 | Teichmann et al. | 280/124.109 |
| 8,585,132 B2 * | 11/2013 | Klimek et al. | 296/187.08 |
| 8,602,454 B1 * | 12/2013 | Baccouche et al. | 280/781 |
| 8,668,248 B2 * | 3/2014 | Ishizono et al. | 296/187.08 |
| 8,820,823 B1 * | 9/2014 | Shafer et al. | 296/204 |
| 2008/0007089 A1 * | 1/2008 | Bachmann | 296/187.08 |
| 2010/0187864 A1 | 7/2010 | Tsuchida | |
| 2010/0264637 A1 | 10/2010 | Kosaka et al. | |
| 2013/0049407 A1 * | 2/2013 | Kageyama | 296/204 |
| 2013/0257103 A1 * | 10/2013 | Mildner et al. | 296/193.07 |
| 2013/0341969 A1 * | 12/2013 | Fujii et al. | 296/193.07 |
| 2014/0306485 A1 * | 10/2014 | Bechtler et al. | 296/187.08 |

FOREIGN PATENT DOCUMENTS

| | | | | |
|---|---|---|---|---|
| JP | 05058347 A | * | 3/1993 | B62D 25/20 |
| JP | 06144300 A | * | 5/1994 | B62D 25/20 |
| JP | A-9-207824 | | 8/1997 | |
| JP | A-2005-206108 | | 8/2005 | |
| JP | A-2008-184125 | | 8/2008 | |
| JP | A-2009-29244 | | 2/2009 | |
| JP | A-2009-120100 | | 6/2009 | |
| WO | WO 2009/072614 A1 | | 6/2009 | |

\* cited by examiner

US 9,073,578 B2

VEHICLE UNDERBODY STRUCTURE

TECHNICAL FIELD

The present invention relates to a vehicle underbody structure coupled by a brace to both left and right sides of a vehicle floor tunnel.

BACKGROUND ART

In Japanese Patent Application Laid-Open (JP-A) No. 2005-206108, a configuration is described in which a rear end side of a left side floor frame and a rear end side of a right side floor frame (both referred to as "front side members" in JP-A No. 2005-206108) are coupled together through a brace having an X-shape in plan view (referred to as an "engine rear support member" in JP-A No. 2005-206108).

A configuration is also described in FIG. 3 of JP-A No. 2009-120100 in which a first transverse brace, connecting left and right floor frames (referred to in JP-A No. 2009-120100 as "floor members"), and a second transverse brace, provided at the rear of the first transverse brace and connecting both left and right sides of a floor tunnel, are connected together by first and second diagonal braces.

DISCLOSURE OF INVENTION

Technical Problem

In the configuration described in JP-A No. 2005-206108, when load is applied from the front side to the floor frame on one side out of the left or right sides, the load is transmitted through the brace to a front side member on the other side out of the left or right sides. Load transmitted in this way acts to shear the coupling portion between the brace and the floor frame on the other side out of the left or right sides. It is consequently necessary to set a high mechanical strength for the coupling portions between the brace and the floor frames.

However, in the configuration described in JP-A No. 2009-120100, when load from the front side is transmitted from the floor tunnel to the second transverse brace, the load is transmitted to the first transverse brace through the first and the second diagonal braces, and load is also transmitted through the first transverse brace to the floor frame. In the configuration illustrated in FIG. 3 of JP-A No. 2009-120100, the second diagonal brace is connected to the fastening portion between the first transverse brace and the floor frame. Load transmitted from the second transverse brace to the second diagonal brace consequently acts to shear the fastening portion between the first transverse brace and the floor frame. It is consequently necessary to set a high mechanical strength for the coupling portions of the braces and the floor frames.

In consideration of the above circumstances, an object of the present invention is to obtain a vehicle underbody structure that can maintain coupling between a brace and a floor frame against load transmitted through the brace from the front side, even when the mechanical strength of the coupling portions of the brace and the floor frame is not particularly high.

Solution to Problem

A vehicle underbody structure according to a first aspect of the present invention includes: a pair of left and right floor frames provided so as to respectively extend along a vehicle front-rear direction; a floor tunnel provided between the floor frame on the left side and the floor frame on the right side, the floor tunnel comprising a tunnel portion that bulges upwards and opens downwards; and a brace comprising a front-side coupling member fixed to the floor tunnel at both left and right sides of the tunnel portion so as to straddle the tunnel portion and a rear-side coupling member provided at a rear of the front-side coupling member, with one end side of the rear-side coupling member fixed to one of the floor frames, and with the other end side of the rear-side coupling member fixed to the other of the floor frames, the brace further comprising a load transmission section that connects the front-side coupling member to a portion of the rear-side coupling member further towards a left-right direction central side than a coupling portion of the rear-side coupling member to the floor frames.

In the vehicle underbody structure of the first aspect of the present invention, one end side of the rear-side coupling member configuring the brace is fixed to one of the left and right pair of floor frames that extends along the vehicle front-rear direction, and the other end side of the rear-side coupling member is fixed to the other of the left and right pair of the floor frames. The floor tunnel is provided between the left and right floor frames and includes the tunnel portion that bulges upwards and opens downwards. The two end sides of the front-side coupling member that is provided further forwards than the rear-side coupling member are coupled to the floor tunnel at the respective left and right sides of the tunnel portion.

When a load is input from the vehicle front to one of the left and right floor frames, the coupling portion between the front-side coupling member and the floor tunnel on one side out of the left or right sides attempts to displaces towards the rear relative to the coupling portion between the front-side coupling member and the floor tunnel on the other side out of the left and right sides, accordingly attempting to twist the axial direction running along the left-right direction. However, the front-side coupling member is connected to the rear-side coupling member by the load transmission section. Such twisting can be suppressed due to the front-side coupling member accordingly exhibiting high rigidity to twisting, and rearwards displacement of one of the left and right sides of the front-side coupling member with respect to the other side of the left and right sides of the front-side coupling member can therefore also be suppressed.

The load transmitted from the floor tunnel to the front-side coupling member is transmitted to the rear-side coupling member through the load transmission section. However, the load transmission section is connected to the rear-side coupling member further towards the left-right direction central inside than the coupling portion of the rear-side coupling member to the floor frames. Therefore, for example, a load transmitted from the floor tunnel to the load transmission section through the front-side coupling member is transmitted to the rear-side coupling member further towards the left-right direction central inside than the coupling portion of the rear-side coupling member to the floor frames. Since the load is accordingly not transmitted directly to the coupling portion between the rear-side coupling member and the floor frames, coupling between the rear-side coupling member and the floor frames can be maintained, and the load can continue to be transmitted to the floor frames through the rear-side coupling member.

A vehicle underbody structure according to a second aspect of the present invention is the first aspect of the present invention wherein the load transmission section includes: a pair of left and right outside load transmission members configured such that a length direction front end of each of the outside load transmission members is connected to the floor tunnel further towards a left-right direction outer side than the tunnel portion, and a length direction rear end of each of the outside load transmission members is connected to the rear-side coupling member further towards the left-right direction outer side than the length direction front end of the outside load transmission members and further towards the left-right direction central side than the coupling portion of the rear-side coupling member to the floor frames.

According to the vehicle underbody structure of the second aspect of the present invention, the length direction front end of each of the outside load transmission members that configure the load transmission section is connected to the floor tunnel. The length direction rear end of each of the outside load transmission members is connected to the rear-side coupling member further towards the left-right direction outer side than the length direction front side of the outside load transmission members and further towards the left-right direction central side than the coupling portion of the rear-side coupling member to the floor frames.

A load transmitted from the floor tunnel to the front-side coupling member is transmitted to the rear-side coupling member through the outside load transmission members, and further transmitted from the rear-side coupling member to the floor frames. The load transmitted from the floor tunnel to the rear-side coupling member through the front-side coupling member and the load transmission section consequently acts to attempt to deform the rear-side coupling member about the coupling portion between the outside load transmission members and the rear-side coupling member. Coupling between the rear-side coupling member and the floor frames can accordingly be suppressed from being released by the load. Coupling between the rear-side coupling member and the floor frames can accordingly be maintained, enabling load to continue to be transmitted to the floor frames through the rear-side coupling member.

A vehicle underbody structure according to a third aspect of the present invention is the second aspect of the present invention, wherein the load transmission section further includes: a pair of left and right inside load transmission members configured such that a length direction front end of each of the inside load transmission members is connected to at least one of the outside load transmission members or the front-side coupling member, and a length direction rear end of each of the inside load transmission members is connected to the rear-side coupling member between the two outside load transmission members, and the length direction rear ends of the inside load transmission members are connected to each other.

According to the vehicle underbody structure of the third aspect of the present invention, the length direction front end of each of the inside load transmission members is connected to at least one of the outside load transmission members corresponding to the inside load transmission members or the front-side coupling member. The length direction rear ends of the inside load transmission members are also connected together between the two outside load transmission members, and the length direction rear ends of the inside load transmission members are connected to each other.

Due to providing the thus configured inside load transmission members, the mechanical strength at the coupling portions between the inside load transmission members and the rear-side coupling member, and the vicinity thereof, can be strengthened relative to the coupling portions between the outside load transmission members and the rear-side coupling member, and the vicinity thereof. As well as ensuring the mechanical strength of the brace overall, load transmitted from the floor tunnel to the front-side coupling member can accordingly also be concentrated at the coupling portion between the outside load transmission members and the rear-side coupling member, and at the vicinity thereof.

A vehicle underbody structure according to a fourth aspect of the present invention is the second aspect or the third aspect of the present invention wherein the brace is set such that when a load of a specific magnitude or greater acts on the rear-side coupling member through the outside load transmission members, the rear-side coupling member deforms such that a coupling portion between the outside load transmission members and the rear-side coupling member is displaced rearwards with respect to a coupling portion between the rear-side coupling member and the floor frames.

According to the vehicle underbody structure of the fourth aspect of the present invention, when the load transmitted from the floor tunnel to the rear-side coupling member through the front-side coupling member and the outside load transmission members is the specific magnitude or greater, the rear-side coupling member deforms such that the coupling portion between the outside load transmission members and the rear-side coupling member is displaced rearwards with respect to the coupling portion between the rear-side coupling member and the floor frames. Due to load being expended on the rear-side coupling member deforming in this manner, coupling between the rear-side coupling member and the floor frames can be suppressed from being released by the load. Coupling between the rear-side coupling member and the floor frames can therefore be maintained, and a load can accordingly continue to be transmitted to the floor frames through the rear-side coupling member.

A vehicle underbody structure of a fifth aspect of the present invention is any one of the first aspect to the fourth aspect of the present invention wherein: the vehicle underbody structure further comprises rockers provided so as to extend along both left and right sides of the vehicle; the vehicle underbody structure further comprises cross members disposed with the length direction of each of the cross members extending along a left-right direction, with one length direction end of the cross members coupled to the rocker and the other length direction end of the cross members coupled to the floor tunnel at a left-right direction outer side of the tunnel portion; and the front-side coupling member is coupled to the floor tunnel at a left-right direction outer side of a coupling portion between the cross members and the floor tunnel.

According to the vehicle underbody structure of the fifth aspect of the present invention, the cross members are coupled to the floor tunnel and the front-side coupling member of the brace is coupled to the floor tunnel at the left-right direction outer side of the coupling portion between the floor tunnel and the cross members. One length direction end of the cross members (an end portion of the two length direction ends not coupled to the floor tunnel) is coupled to the rocker. The rigidity of the front-side coupling member can be raised due to coupling the front-side coupling member of the brace to the cross members in this manner, and deformation can be suppressed of the front-side coupling member due to load transmitted from the floor tunnel.

A vehicle underbody structure of a sixth aspect of the present invention is the first aspect of the present invention wherein the plural load transmission sections are provided, and the plural load transmission sections are coupled to enable relative displacement between the plural load transmission sections when a load of a specific magnitude or greater is transmitted from the front-side coupling member to at least one load transmission section out of the plural load transmission sections.

According to the vehicle underbody structure of the sixth aspect of the present invention, the front-side coupling member and the rear-side coupling member are connected together by the plural load transmission sections. The plural load transmission sections are mutually coupled to the front-side coupling member, and the plural load transmission sections are displaced relative to each other when a load of a specific magnitude or greater is transmitted from the front-side coupling member to at least one load transmission section out of the plural load transmission sections. Due to the load expended in such relative displacement, the coupling between the rear-side coupling member and the floor frames can be suppressed from being released by the load and coupling between the rear-side coupling member and the floor frames can accordingly be maintained.

Advantageous Effects of Invention

As described above, the vehicle underbody structure of the first aspect can prevent or suppress release of coupling between the rear-side coupling member and the floor frames due to load from the vehicle front direction, and can thereby maintain coupling between the brace and the floor frames.

The vehicle underbody structure of the second aspect can prevent or suppress release of the coupling between the rear-side coupling member and the floor frames due to load transmitted from the outside load transmission members to the rear-side coupling member acting to deform the rear-side coupling member. Load can accordingly continue to be transmitted to the floor frames through the rear-side coupling member.

The vehicle underbody structure of the third aspect can ensure the mechanical strength of the brace whilst also concentrating load from the vehicle front side at the coupling portions between the outside load transmission members and the rear-side coupling member, and in the vicinity thereof.

The vehicle underbody structure of the fourth aspect can suppress load from releasing coupling between the rear-side coupling member and the floor frames, due to load expended in deforming the rear-side coupling member in the brace, and can therefore continue to transmit load to the floor frames through the rear-side coupling member.

The vehicle underbody structure of the fifth aspect can raise the rigidity of the front-side coupling member of the brace, and can therefore suppress deformation of the front-side coupling member due to load transmitted from the floor tunnel.

In the vehicle underbody structure of the sixth aspect, the plural load transmission sections are displaced relative to each other by load of a specific magnitude or greater being transmitted from the front-side coupling member to at least one load transmission section out of the plural load transmission sections, and a load is expended in such relative displacement. Coupling between the rear-side coupling member and the floor frames can accordingly be suppressed from being released by the load, and the load can hence continue to be transmitted through the rear-side coupling member to the floor frames.

DESCRIPTION OF EMBODIMENTS

Figure 1:
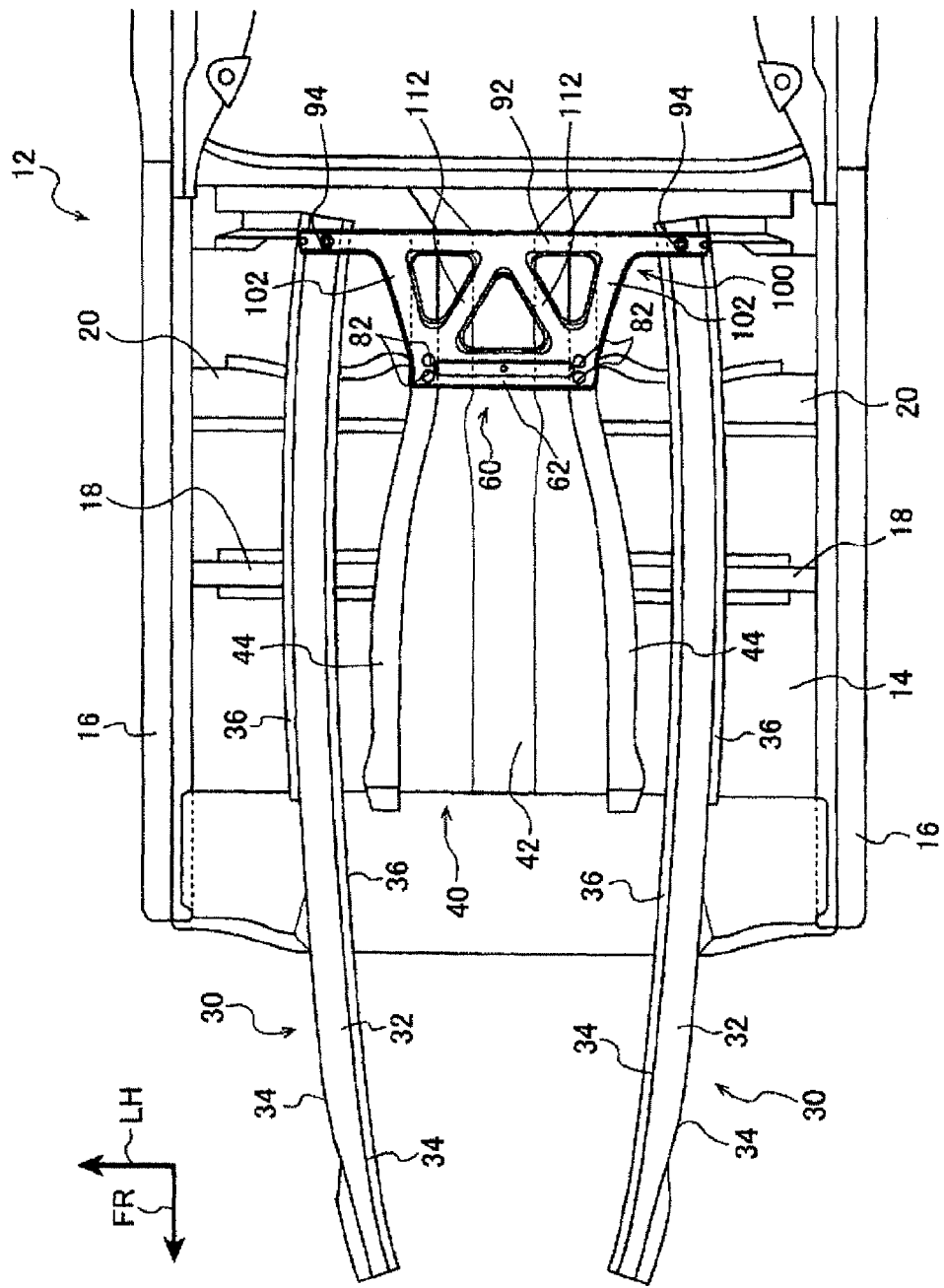
FIG. 1 is a drawing of relevant portions of a vehicle applied with a vehicle underbody structure according to a first exemplary embodiment, viewed from below.

Explanation follows of exemplary embodiments of the present invention based on FIG. 1 to FIG. 8. Note that in the explanations of each of the exemplary embodiments below, features of the exemplary embodiment or modified example being described that are essentially the same as those of previous exemplary embodiments are appended with the same reference numerals and detailed description thereof is omitted. In each of the drawings, the arrow FR indicates a front direction in the front-rear direction of a vehicle 12 to which a vehicle underbody structure according to the present invention has been applied, the arrow LH indicates a left-hand direction in the left-right direction (vehicle width direction) of the vehicle 12, and the arrow UP indicates an upwards direction in the up-down direction of the vehicle 12.

Configuration of the First Exemplary Embodiment

FIG. 1 is a drawing illustrating a floor of the vehicle 12 to which a vehicle underbody structure according to the first exemplary embodiment has been applied, as viewed from the bottom side of the vehicle. The vehicle 12 is provided with a floor panel 14. A rocker 16 is provided at both left-right direction sides of the floor panel 14. Each of the rockers 16 is provided extending along the vehicle 12 front-rear direction (the direction of the arrow FR and the opposite direction thereto) Each of the rockers 16 is configured with for example a cross-section taken along a direction orthogonal to the front-rear direction of a closed rectangular cross-sectional profile.

A left and right pair of cross members 18 is provided at the bottom side of the floor panel 14 and at length direction intermediate portions of the rockers 16. The cross members 18 are provided so as to extend along the vehicle 12 left-right direction. A cross-sectional profile taken along a direction orthogonal to the length direction of the cross members 18 is for example a recessed cross-sectional profile (a cross-sectional hat profile) open towards the vehicle 12 upper side, or closed cross-sectional profile of, for example, a rectangle.

A length direction right side end portion of the right side cross member 18 is fixed to the right side rocker 16 using fixing means such as welding or fastening means such as bolting, and a left side end portion of the right side cross member 18 is fixed to a floor tunnel 40, described later, using fixing means such as welding or fastening means such as bolting. However a length direction left side end portion of the left side cross member 18 is fixed to the left side rocker 16 using fixing means such as welding or fastening means such as bolting, and a right side end portion of the left side cross member 18 is fixed to the floor tunnel 40, described later, using fixing means such as welding or fastening means such as bolting.

A left and right pair of cross member 20 are provided at the bottom side of the floor panel 14 at the rear of the cross members 18. The cross members 20 are provided so as to extend along the vehicle 12 left-right direction. A cross-sectional profile taken along a direction orthogonal to the length direction of the cross members 20 is for example a recessed cross-sectional profile open towards the vehicle 12 upper side, or a closed cross-sectional profile of for example, a rectangle.

A length direction right side end portion of the right side cross member 20 is fixed to the right side rocker 16 using fixing means such as welding or fastening means such as bolting, and a left side end portion of the right side cross member 20 is fixed to the floor tunnel 40, described later, using fixing means such as welding or fastening means such as bolting. However a length direction left side end portion of the left side cross member 20 is fixed to the left side rocker 16 using fixing means such as welding or fastening means such as bolting, and a right side end portion of the left side cross member 20 is fixed to the floor tunnel 40, described later, using fixing means such as welding or fastening means such as bolting.

Figure 4:
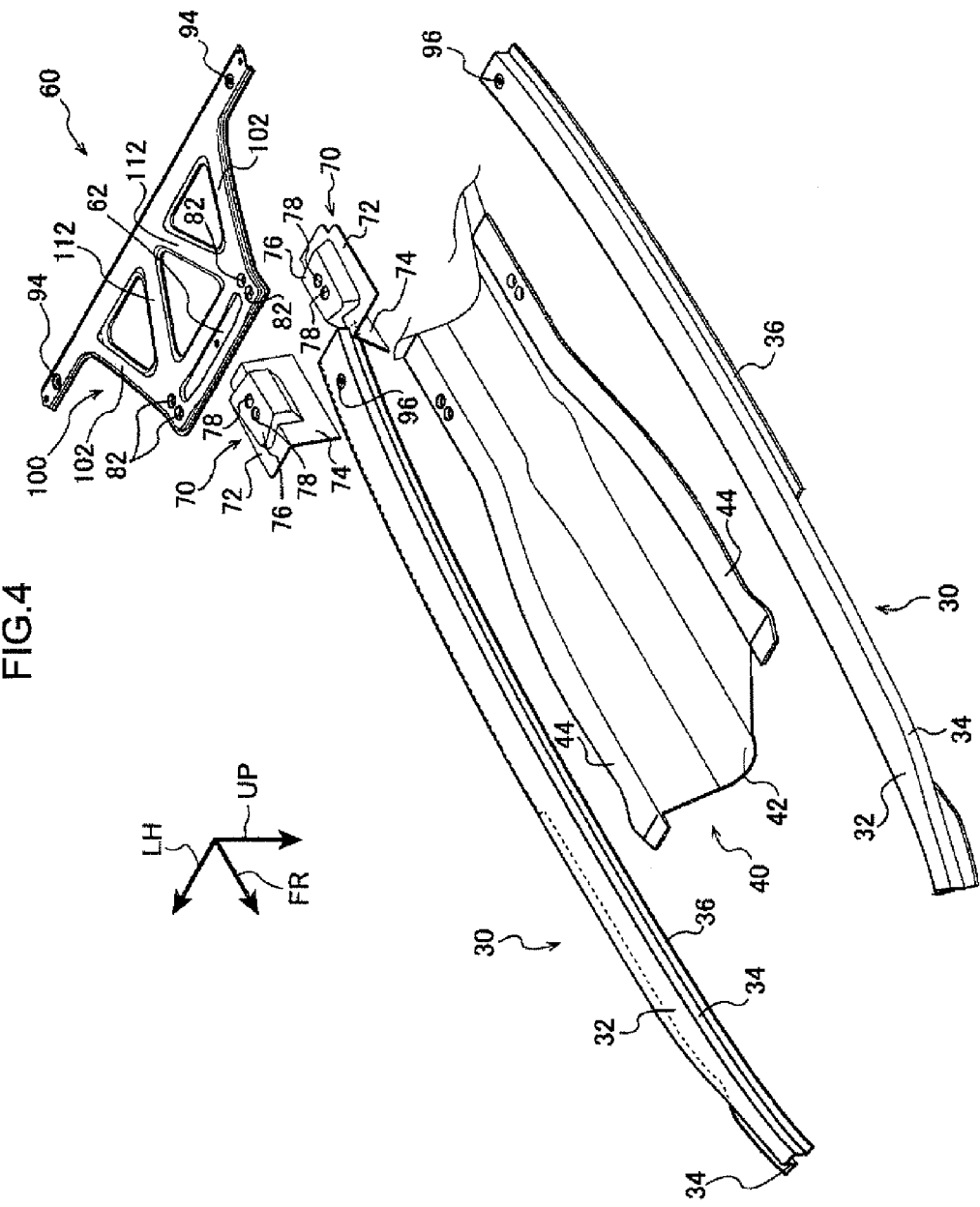
FIG. 4 is an exploded perspective view illustrating relevant portions of a vehicle underbody structure according to the first exemplary embodiment.

A left and right pair of floor frames 30, also referred to as, for example, front side members, is provided at the bottom side of the cross members 18, 20 situated between the left and right rockers 16. As shown in FIG. 4, the floor frames 30 are each provided with a bottom wall 32. Each bottom wall 32 is formed in a flat plate shape with the length direction extending in the vehicle 12 front-rear direction. Each width direction side portion of the bottom walls 32 is provided with a side wall 34 extending from the bottom walls 32 towards the vehicle 12 top. Flanges 36 extend towards the bottom wall 32 width direction outer sides from top end portions of the side walls 34 (end portions of the side walls 34 on the opposite sides to the bottom wall 32). A cross-sectional profile of the floor frames 30 taken in a direction orthogonal to the length direction of the bottom wall 32 accordingly has a hat-shaped profile (or a recessed profile) open towards the vehicle 12 top. The flanges 36 in the floor frames 30 are integrally joined to the cross members 18 and the cross members 20 by, for example, spot welding as appropriate.

As shown in FIG. 1, the floor tunnel 40 is provided at a bottom side of the cross members 18, 20 situated between the left side floor frame 30 and the right side floor frame 30. As shown in FIG. 4, the floor tunnel 40 is provided with a tunnel portion 42. The tunnel portion 42 gradually bulges towards the vehicle 12 top on progression from left and right side ends towards the central side of the tunnel portion 42, so as to form a recessed cross-sectional profile overall, opening downwards. A muffler, not shown in the drawings, passes through inside the tunnel portion 42. The tunnel portion 42 is integrally coupled to the cross members 18 and the cross members 20 described above using a fixing means such as welding or a fastening means such as bolting. Flange portions 44 extend from both left and right side ends of the tunnel portion 42 towards the left-right direction outer sides of the vehicle 12.

Figure 5:
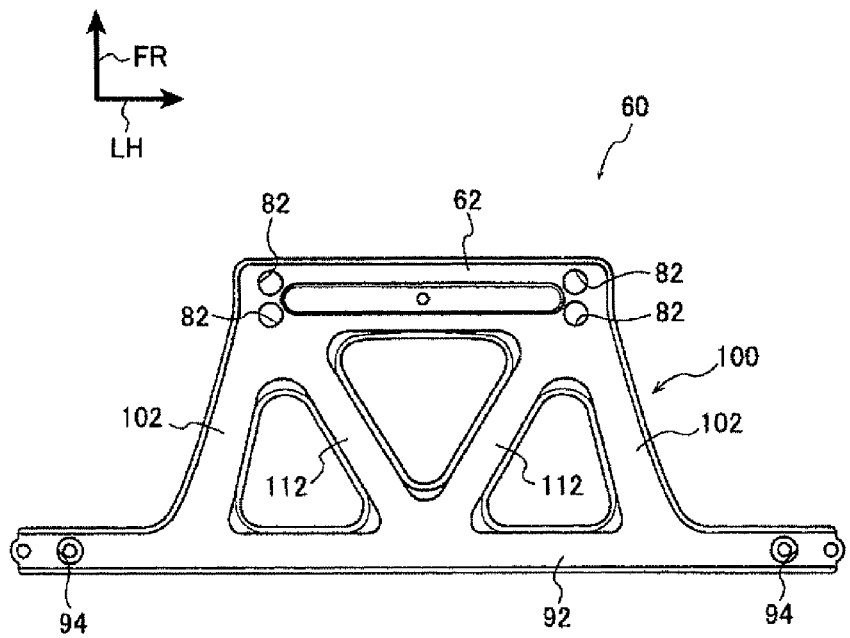
FIG. 5 is a plan view of a brace applied to a vehicle underbody structure according to the first exemplary embodiment.

As shown in FIG. 1 and FIG. 4, a brace 60 is provided at a rear end side of the floor frames 30 and at the bottom side of the floor tunnel 40. The brace 60 is formed for example from what is referred to as "hot-dip galvanized steel plate", this being cold rolled steel plate that has been galvanized with zinc. As shown in FIG. 5, the brace 60 is provided with a front-side coupling member 62. The front-side coupling member 62 is formed with a substantially plate-shaped profile, with length direction extending along the vehicle 12 left-right direction and width direction extending in the vehicle 12 front-rear direction. Both width direction sides of the front-side coupling member 62 are further bent around upwards in the up-down direction. A cross-sectional profile of the front-side coupling member 62 taken along a direction orthogonal to its length direction accordingly has a recessed profile opening upwards.

The front-side coupling member 62 is provided so as to face the cross members 20 in a vertical direction, with the floor tunnel 40 interposed therebetween. As shown in FIG. 4, brackets 70 are also provided at both length direction end sides of the front-side coupling member 62. Each of the brackets 70 is provided with a flat plate shaped flange-side fixing plate 72. The flange-side fixing plates 72 face the flanges 44 of the floor tunnel 40 along the thickness direction, and the flange-side fixing plates 72 and the flanges 44 are integrally fixed together using fixing means such as welding or fastening means such as bolting.

Each of the brackets 70 is also provided with a tunnel-side fixing plate 74. The tunnel-side fixing plates 74 are formed with plate shapes that follow the slope of the tunnel portion 42 inside, in the vicinity of both left-right direction end portions of the tunnel portion 42. The flange-side fixing plates 72 face along the thickness direction towards the inside face of the tunnel portion 42, and the tunnel-side fixing plates 74 and the tunnel portion 42 are integrally fixed together using fixing means such as welding or fastening means such as bolting.

A brace fixing portion 76 is formed to each of the brackets 70. The brace fixing portions 76 are configured with plate shapes having thickness directions extending in the vehicle 12 up-down direction. The brace fixing portions 76 face the length direction end sides of the front-side coupling member 62 along the up-down direction. A front-rear pair of through holes 78 is formed to each of the brace fixing portions 76. A front-rear pair of through holes 82 is formed to each length direction end side of the front-side coupling member 62 so as to face the through holes 78. Bolts, not shown in the drawings, are passed from the top through the through holes 78 and the through holes 82.

A welded nut, not shown in the drawings, is fixed to the face of each brace fixing portion 76 on the opposite side to the front-side coupling member 62 and coaxially to each of the through holes 78. The front-side coupling member 62 of the brace 60 is integrally fastened and fixed to the brackets 70 by screwing the bolts which have been passed through the through holes 82 and the through holes 78 into the welded nuts. The left and right end sides of the front-side coupling member 62 are accordingly fixed to the floor tunnel 40 at the left and right sides of coupling portions, respectively, between the floor tunnel 40 and the cross members 20.

As shown in FIG. 1 and FIG. 4, the brace 60 is also provided with a rear-side coupling member 92. As shown in FIG. 5, the rear-side coupling member 92 is provided further to the vehicle rear side than the front-side coupling member 62. The rear-side coupling member 92 is formed with a substantially plate-shaped profile, having a length direction extending along the vehicle 12 left-right direction that has a longer length dimension than the front-side coupling member 62 described above, and having a width direction extending along the vehicle 12 front-rear direction. Both width direction sides of the rear-side coupling member 92 bend around upwards in the up-down direction. A cross-sectional profile of the rear-side coupling member 92 taken along a direction orthogonal to the length direction of the rear-side coupling member 92 accordingly has a recessed profile opening upwards.

Through holes 94 are formed at both length direction end sides of the rear-side coupling member 92 so as to pierce through the rear-side coupling member 92 in the thickness direction. Through holes 96 are also formed to the bottom walls 32 of both the left and right floor frames 30 so as to be aligned with the through holes 94. Bolts, not shown in the drawings, are passed from the top through the through holes 94 and the through holes 96. A nut, not shown in the drawings, is provided at a face of each bottom wall 32 on the opposite side to the rear-side coupling member 92 and coaxially to each of the through holes 96. The rear coupling member 92 is integrally fastened and fixed to the bottom walls 32 (namely both floor frames 30) by screwing the bolts which have been passed through the through holes 94 and the through holes 96 into the nuts.

A load transmission section 100 is provided between the rear-side coupling member 92 and the front-side coupling member 62. The load transmission section 100 is provided with a pair of left-right outside load transmission members 102. The length directions of the pair of outside load transmission members 102 are inclined towards left and right directions relative to the vehicle 12 front-rear direction. The left side outside load transmission member 102 is accordingly positioned further towards the vehicle 12 left side at a back end than at a front end, and the right side outside load transmission member 102 is positioned further towards the vehicle 12 right side at a back end than at a front end (namely, the outside load transmission members 102 are positioned further towards the vehicle 12 left-right direction outer side at the rear ends than at the front ends). Both width direction sides of the outside load transmission members 102 are bent around upwards. A cross-sectional profile of the outside load transmission members 102 taken along a direction orthogonal to the length direction of the outside load transmission members 102 accordingly has a recessed profile opening upwards.

The front end of the left side outside load transmission member 102 is connected to a length direction left side end portion of the front-side coupling member 62, and a front end of the right side outside load transmission member 102 is connected to a length direction right side end portion of the front-side coupling member 62. However the rear end of the left side outside load transmission member 102 is connected to the rear-side coupling member 92 further to the right side than the fastening and fixing portion between the rear-side coupling member 92 length direction left side and the bottom wall 32 (the floor frame 30), and the rear end of the right side outside load transmission member 102 is connected to the rear-side coupling member 92 further to the left side than the fastening and fixing portion between the rear-side coupling member 92 length direction right side and the bottom wall 32 (the floor frame 30).

A pair of left-right inside load transmission members 112 is provided between the outside load transmission members 102. The length directions of the inside load transmission members 112 are inclined towards the left and right relative to the vehicle 12 front-rear direction. The left side inside load transmission member 112 is positioned further towards the vehicle 12 right side at the back end than at the front end, and the right side inside load transmission member 112 is accordingly positioned further towards the vehicle 12 left side at the back end than at the front end (namely the inside load transmission members 112 are positioned further towards the vehicle 12 left-right direction central side at the rear ends than at the front ends). Both width direction sides of the inside load transmission members 112 are bent around upwards. A cross-sectional profile of the inside load transmission members 112 taken along a direction orthogonal to the length direction of the inside load transmission members 112 accordingly has a recessed profile opening upwards.

The front end of the left side inside load transmission member 112 is connected to a length direction left side end portion of the front-side coupling member 62 and to the front end of the left side outside load transmission member 102. The front end of the right side inside load transmission member 112 is connected to a length direction right side end portion of the front-side coupling member 62 and a front end of the right side outside load transmission member 102. However the rear end of the left side inside load transmission member 112 and the rear end of the right side inside load transmission member 112 are connected to the rear-side coupling member 92 at a length direction substantially central portion of the rear-side coupling member 92. The outside load transmission members 102 and the inside load transmission members 112 of the brace 60 accordingly form an M-shape (or an inverted W-shape), as seen in plan view.

By providing the outside load transmission members 102 and the inside load transmission members 112 in such a configuration, the length direction central portion side of the rear-side coupling member 92 (namely, the portion where the rear-side coupling member 92 and the inside load transmission members 112 are connected together, and the vicinity thereof) is imparted with mechanical strengthen higher than that of the portion where the rear-side coupling member 92 and the outside load transmission members 102 are connected together, and the vicinity thereof.

Operation and Advantageous Effects of the First Exemplary Embodiment

In the exemplary embodiment of the above configuration, for example in what is referred to as an "offset collision", when load towards the rear acts on the front end of the left side floor frame 30, the load is transmitted to the floor tunnel 40 through the respective cross member 18 and the respective cross member 20. Load acts to attempt to cause relative displacement of the left side of the floor tunnel 40 towards the rear and the right side of the floor tunnel 40 towards the front (namely load acts to shear the floor tunnel 40 along the front-rear direction). This load is also transmitted to the front-side coupling member 62 of the brace 60 through the floor tunnel 40 and the brackets 70, where it acts to attempt to cause relative displacement of the left side end portion of the front-side coupling member 62 towards the rear and the right side end portion of the front-side coupling member 62 towards the front.

This load is also transmitted to the rear-side coupling member 92 through both the outside load transmission members 102 and through both the inside load transmission members 112, and is transmitted to the bottom walls 32 (namely, the floor frames 30) through the rear-side coupling member 92. The load transmitted to the floor frames 30 consequently attempts to cause relative displacement of the coupling portion of the left side floor frame 30 and the rear-side coupling member 92 towards the rear, and attempts to cause relative displacement of the coupling portion of the right side floor frame 30 and the rear-side coupling member 92 towards the front. Due to the loads acting as described, load acts to attempt to twist the front-side coupling member 62 and the rear-side coupling member 92 around an axis with axial direction along the length direction of the front-side coupling member 62 and the rear-side coupling member 92.

However, in the present exemplary embodiment, the left and right outside load transmission members 102, the left and right inside load transmission members 112, the front-side coupling member 62 and the rear-side coupling member 92 are integrally connected together. There is consequently high rigidity resisting such twisting of the front-side coupling member 62 and the rear-side coupling member 92 described above. Twisting deformation of the front-side coupling member 62 and the rear-side coupling member 92 can accordingly be suppressed from occurring.

Figure 2:
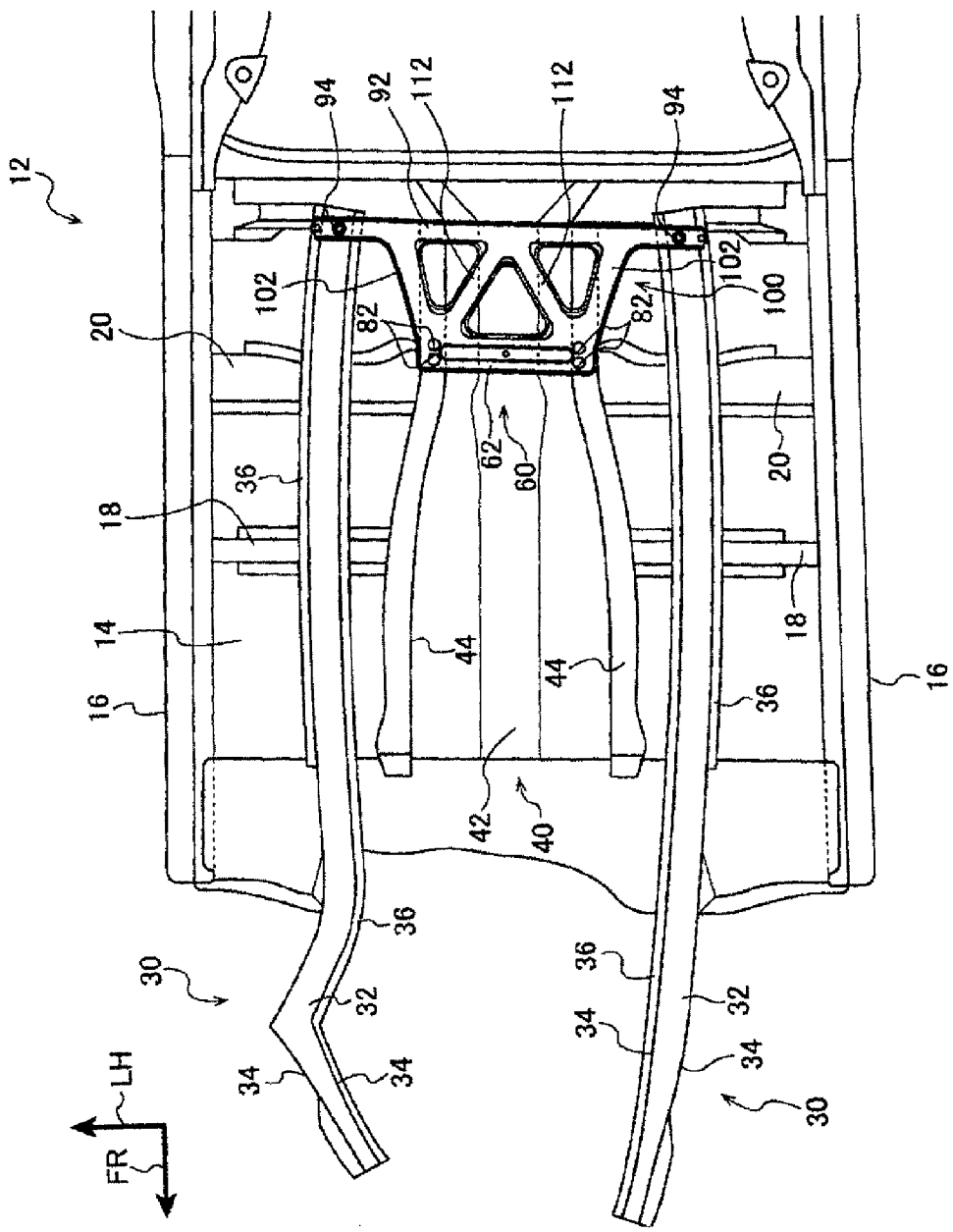
FIG. 2 is a drawing corresponding to FIG. 1 illustrating a state in which load has acted on a front end of one floor frame.

Since twisting deformation in the front-side coupling member 62 and the rear-side coupling member 92 is suppressed from occurring, as shown in FIG. 2, rearwards displacement of the length direction left sides of the front-side coupling member 62 and the rear-side coupling member 92, and forwards displacement of the length direction right sides thereof can be suppressed. The coupling portions of the front-side coupling member 62 and both the brackets 70, the coupling portions of the brackets 70 and the flanges 44 of the floor tunnel 40, and the coupling portions of the rear-side coupling member 92 and both the floor frames 30 can accordingly be prevented or suppressed from breaking. Coupling at these coupling portions can accordingly be prevented or suppressed from forced release.

In the present exemplary embodiment, the rear-side coupling member 92 and the outside load transmission members 102 are also connected together further to the left-right direction central side than the through holes 94 in the rear-side coupling member 92 that are at the coupling portions of the rear-side coupling member 92 and the floor frames 30. The load described above is therefore transmitted through the respective outside load transmission member 102 further to the left-right direction central side than the respective through hole 94. The load transmitted to the rear-side coupling member 92 consequently attempts to deform the rear-side coupling member 92 around an axis with axial direction along the thickness direction of the outside load transmission member 102, about the rear end portion of the respective outside load transmission member 102. Load acting to break the coupling portions between the rear-side coupling member 92 and the floor frames 30 is accordingly decreased. Accordingly, coupling between the rear-side coupling member 92 and the floor frames 30 can be maintained even if such load is transmitted to the rear-side coupling member 92, and load can continue to be transmitted from the rear-side coupling member 92 to the floor frames 30.

Figure 3:
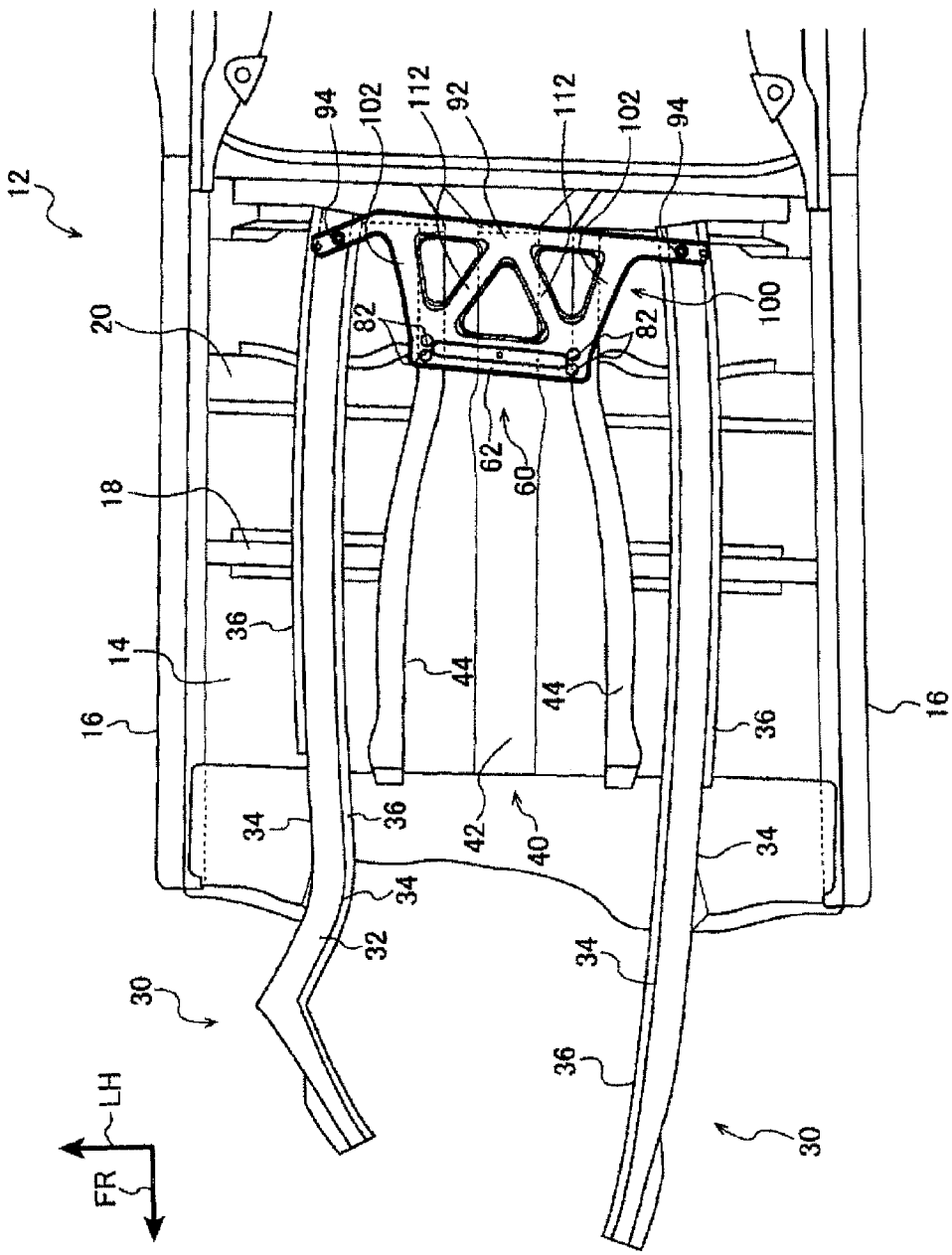
FIG. 3 is a drawing corresponding to FIG. 2 illustrating a state in which load has been transmitted to the front end of one floor frame and a rear-side coupling member of a brace has deformed.

When the load transmitted from the left side outside load transmission member 102 to the rear-side coupling member 92 exceeds the mechanical strength of the rear end portion of the outside load transmission member 102 (the coupling portion of the rear-side coupling member 92 and the outside load transmission member 102) then, as shown in FIG. 3, the rear-side coupling member 92 bends (deforms) such that the rear end portion of the left side outside load transmission member 102 is displaced further rearwards than the coupling portion between the rear-side coupling member 92 and the left side floor frame 30. Such a load therefore serves to deform the rear-side coupling member 92, however since coupling between the rear-side coupling member 92 and the floor frame 30 is still maintained, the load can continue to be transmitted from the rear-side coupling member 92 to the floor frame 30 even after the rear-side coupling member 92 has deformed in this way.

Figure 6:
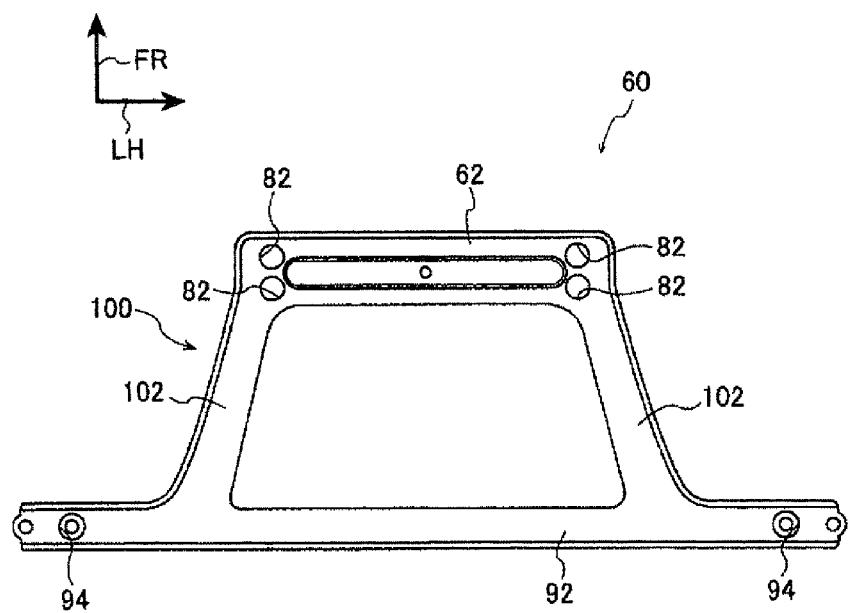
FIG. 6 is a plan view illustrating a modified example of a brace applied to a vehicle underbody structure according to the first exemplary embodiment.

Note that in the present exemplary embodiment, configuration is made such that the pair of inside load transmission members 112 is provided between the left and right outside load transmission members 102. However, as shown in FIG. 6, the load transmission section 100 may for example be configured with the outside load transmission members 102 alone, without providing the inside load transmission members 112. However, providing the inside load transmission members 112 enables the mechanical strength of the rear-side coupling member 92 further to the left-right direction central side than the rear end portions of the outside load transmission members 102 to be raised, to higher than the mechanical strength further to the left-right direction outer side of the rear end portions of the outside load transmission members 102. When configuration is made without provision of the inside load transmission members 112 it is therefore desirable to increase the width and thickness dimensions of the rear-side coupling member 92 at portions further to the left-right direction central side than the rear end portions of the outside load transmission members 102 such that the width and thickness dimensions are greater than at portions further to the left-right direction outer side than the rear end portions of the outside load transmission members 102.

Configuration of the Second Exemplary Embodiment

Explanation follows regarding a second exemplary embodiment.

Figure 7:
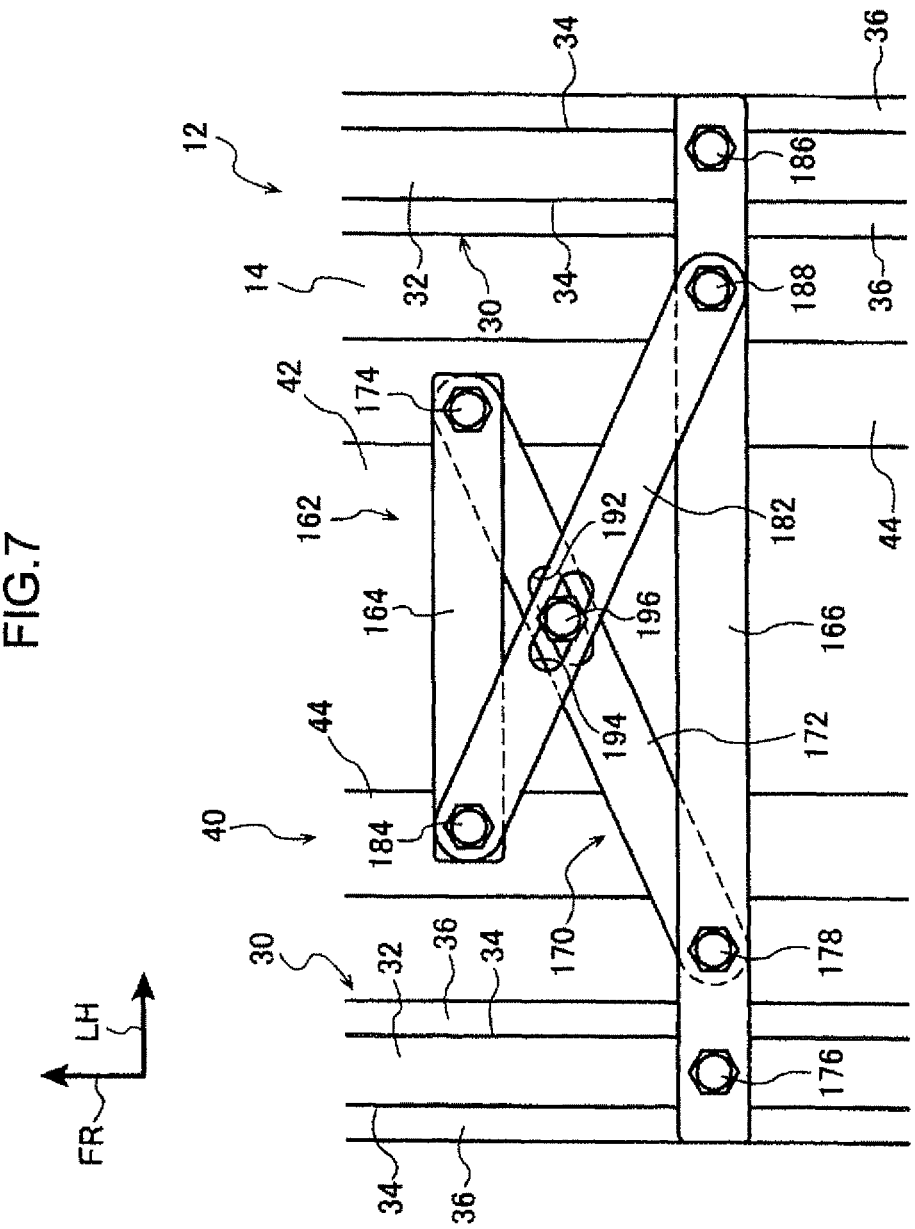
FIG. 7 is a drawing of relevant portions of a vehicle applied with a vehicle underbody structure according to a second exemplary embodiment, viewed from below.

FIG. 7 illustrates a configuration of a brace 162 applied to a vehicle underbody structure of the present exemplary embodiment as viewed from below a vehicle. As shown in FIG. 7, the brace 162 is provided with a front-side coupling member 164 and a rear-side coupling member 166. The front-side coupling member 164 and the rear-side coupling member 166 are, respectively, similar to the front-side coupling member 62 and the rear-side coupling member 92 of the first exemplary embodiment from the perspective of being plate profiles with length directions extending in the vehicle 12 left-right direction. However, the front-side coupling member 164 and the rear-side coupling member 166 differ from the front-side coupling member 62 and the rear-side coupling member 92 in the respect that the front-side coupling member 164 and the rear-side coupling member 166 are configured as separate bodies (as respective separate independent members).

The brace 162 is provided with a load transmission section 170 in place of the load transmission section 100. The load transmission section 170 is provided with a first load transmission member 172. A front end of the first load transmission member 172 is fastened and fixed to the front-side coupling member 164 with a bolt 174 in the vicinity of a left side end portion of the front-side coupling member 164. However a rear end of the first load transmission member 172 is fastened and fixed to the rear-side coupling member 166 by a bolt 178 located further to the left side than a bolt 176 that fastens and fixes the rear-side coupling member 166 to the right side floor frame 30 and located further to the right side than the length direction (the left-right direction) center of the rear-side coupling member 166.

The load transmission section 170 is further provided with a second load transmission member 182. A front end of the second load transmission member 182 is fastened and fixed to the front-side coupling member 164 with a bolt 184 in the vicinity of a right side end portion of the front-side coupling member 164. A rear end of the second load transmission member 182 is fastened and fixed to the rear-side coupling member 166 by a bolt 188 located further to the right side than a bolt 186 that fastens and fixes the rear-side coupling member 166 to the left side floor frame 30 and located further to the left side than the length direction (the left-right direction) center of the rear-side coupling member 166.

An elongated hole 192 is formed at a length direction intermediate portion of the first load transmission member 172. The length direction of the elongated hole 192 extends along the length direction of the first load transmission member 172, and pierces the first load transmission member 172 in the thickness direction. An elongated hole 194 is correspondingly formed at a length direction intermediate portion of the second load transmission member 182. The elongated hole 194 has a length direction extending along the length direction of the second load transmission member 182, and the elongated hole 194 pierces the second load transmission member 182 in the thickness direction.

A portion of the elongated hole 192 and a portion of the elongated hole 194 respectively overlap each other in the thickness direction of the first load transmission member 172 and the second load transmission member 182. A bolt 196 is passed through the elongated holes 192, 194 at the overlapping portions of the elongated hole 192 and the elongated hole 194, such that the first load transmission member 172 and the second load transmission member 182 are integrally fastened and fixed together.

Operation and Advantageous Effects of the Second Exemplary Embodiment

In the configuration of the exemplary embodiment described above, the front-side coupling member 164 and the rear-side coupling member 166 are configured as separate bodies. However the front-side coupling member 164 and the rear-side coupling member 166 are connected together due to the first load transmission member 172 and the second load transmission member 182 being fastened and fixed together with the bolt 196. Similarly to as in the first exemplary embodiment, the front-side coupling member 164 and the rear-side coupling member 166 accordingly both have high rigidity with respect to twisting with an axial direction of their respective length directions. Twisting deformation can accordingly be suppressed from occurring in the front-side coupling member 164 and the rear-side coupling member 166. Coupling portions of the front-side coupling member 164 and the flanges 44 and coupling portions of the through holes 94 and both of the floor frames 30 can accordingly be prevented or suppressed from breaking, enabling coupling at these coupling portions to be prevented or suppressed from being released forcibly.

In the present exemplary embodiment, the rear-side coupling member 166 is connected to the first load transmission member 172 and the second load transmission member 182 further towards the left-right direction central side than the through holes 94 that are the coupling portions of the floor frames 30 to the rear-side coupling member 166. The previously described load is consequently transmitted through the first load transmission member 172 and the second load transmission member 182 further to the left-right direction inside than the coupling portions to the floor frames 30. The load transmitted to the rear-side coupling member 166 that acts so as to attempt to break the coupling portions between the rear-side coupling member 166 and the floor frames 30 is accordingly reduced. Therefore, even if such load is transmitted to the rear-side coupling member 166, coupling between the rear-side coupling member 166 and the floor frames 30 can be maintained, and load can continue to be transmitted from the rear-side coupling member 166 to the floor frames 30.

Figure 8:
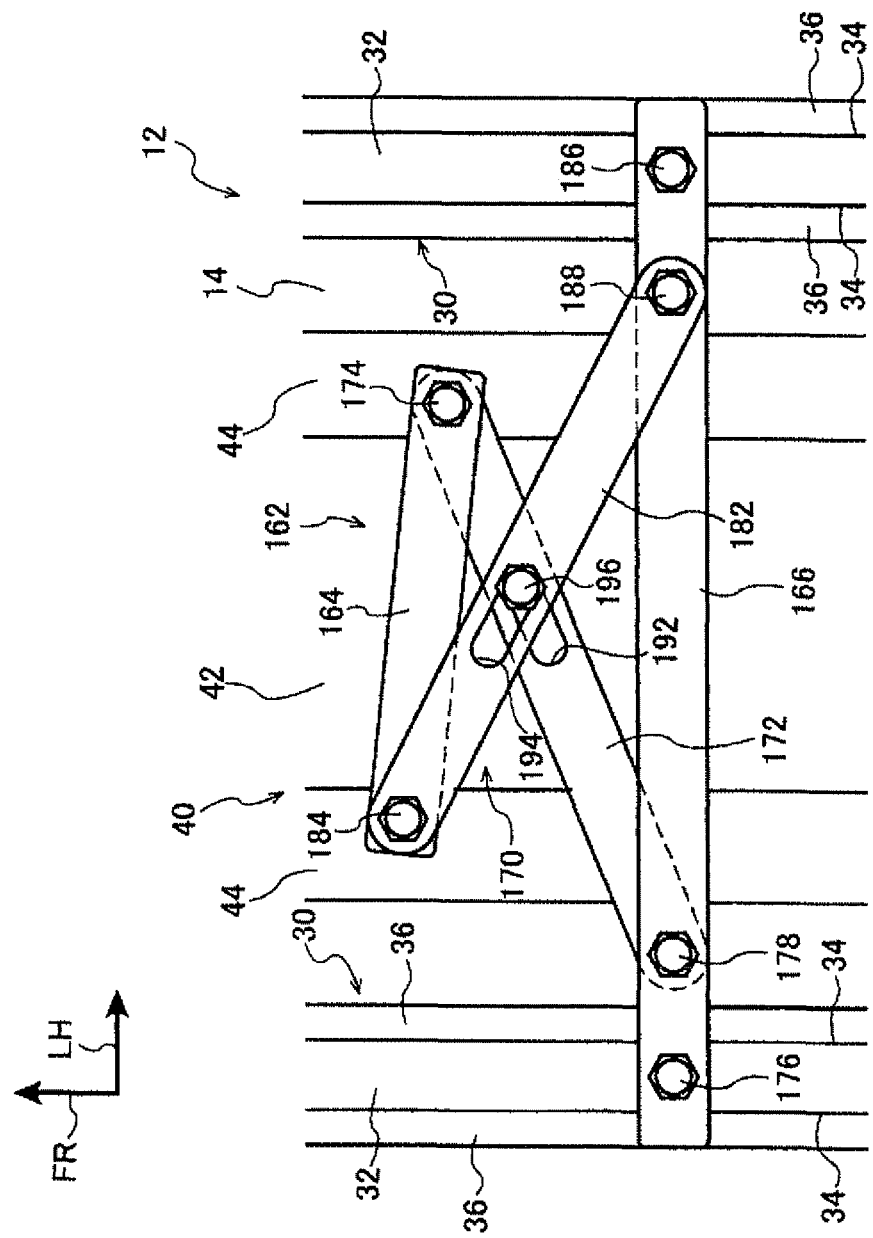
FIG. 8 is a drawing corresponding to FIG. 7 illustrating a state in which load has been transmitted to the brace.

When load transmitted to the first load transmission member 172 and the second load transmission member 182 exceeds the fastening strength of the bolt 196 between the first load transmission member 172 and the second load transmission section 182, as shown in FIG. 8, the first load transmission member 172 and the second load transmission member 182 slide and pivot relative to each other. Coupling between the rear-side coupling member 166 and the floor frames 30 can accordingly be maintained and the load can continue to be transmitted from the rear-side coupling member 166 to the floor frames 30 even though there is a change in the relative positional relationships between the fastening portion of the first load transmission member 172 and the floor tunnel 40 and the fastening portion of the second load transmission member 182 and the floor frame 40.

Note that the width dimensions of the elongated hole 192 and the elongated hole 194 of the present exemplary embodiment are slightly larger along substantially the entire length direction region of the holes than the outside diameter dimension of the bolt 196, such that the bolt 196 is a size that can pass through the elongated holes 192, 194. However, configuration may also be made such that in an initial state of the elongated holes 192, 194, the width dimensions of the elongated holes 192, 194 are smaller than the outside diameter dimension of the bolt 196 at both length direction sides of the portions than where the bolt 196 initially passes through the elongated holes 192, 194. When such a configuration is adopted, the bolt 196 induces plastic deformation in the inner peripheral edges of the elongated holes 192, 194 when the bolt 196 moves from the initial position along the length directions of the elongated holes 192, 194. Some of the load described above can accordingly be absorbed by the plastic deformation at the inner peripheral edges of the elongated holes 192, 194.

The invention claimed is:
1. A vehicle underbody structure, comprising:
a pair of left and right floor frames that are provided between a pair of rockers and are provided so as to respectively extend along a vehicle front-rear direction;
a floor tunnel provided between the floor frame on the left side and the floor frame on the right side, the floor tunnel comprising a tunnel portion that bulges upwards and opens downwards; and
a brace comprising:
a front-side coupling member fixed to the floor tunnel at both left and right sides of the tunnel portion so as to straddle the tunnel portion;
a rear-side coupling member provided at a rear of the front-side coupling member, with one end side of the rear-side coupling member fixed to one of the floor frames, and with the other end side of the rear-side coupling member fixed to the other of the floor frames; and
a load transmission section that connects the front-side coupling member to a portion of the rear-side coupling member further towards a left-right direction central side than a coupling portion of the rear-side coupling member to the floor frames, wherein the load transmission section comprises a pair of left and right outside load transmission members configured such that a length direction rear end of each of the outside load transmission members is connected to the rear-side coupling member further towards the left-right direction outer side than the length direction front end of the outside load transmission members and further towards the left-right direction central side than the coupling portion of the rear-side coupling member to the floor frames.

2. The vehicle underbody structure of claim 1 wherein the pair of left and right outside load transmission members are configured such that a length direction front end of each of the outside load transmission members is connected to the front-side coupling member.

3. The vehicle underbody structure of claim 2 wherein the load transmission section further comprises: a pair of left and right inside load transmission members configured such that a length direction front end of each of the inside load transmission members is connected to at least one of the outside load transmission members or the front-side coupling member, and a length direction rear end of each of the inside load transmission members is connected to the rear-side coupling member between the two outside load transmission members, and the length direction rear ends of the inside load transmission members are connected to each other.

4. The vehicle underbody structure of claim 2 wherein: when a load of a specific magnitude or greater acts on the rear-side coupling member through the outside load transmission members, the rear-side coupling member deforms such that a coupling portion between the outside load transmission members and the rear-side coupling member is displaced rearwards with respect to a coupling portion between the rear-side coupling member and the floor frames.

5. The vehicle underbody structure of claim 1 wherein:
the vehicle underbody structure further provides the pair of rockers so as to extend along both left and right sides of the vehicle;
the vehicle underbody structure further comprises cross members disposed with the length direction of each of the cross members extending along a left-right direction, with one length direction end of the cross members coupled to the rocker and the other length direction end of the cross members coupled to the floor twine at a left-right direction outer side of the tunnel portion; and
the front-side coupling member is coupled to the floor tunnel at a left-right direction outer side of a coupling portion between the cross members and the floor tunnel.

6. The vehicle underbody structure of claim 1 wherein a plurality of the load transmission sections are provided, and the plurality of load transmission sections are coupled to enable relative displacement between the plurality of load transmission sections when a load of a specific magnitude or greater is transmitted from the front-side coupling member to at least one load transmission section out of the plurality of load transmission sections.

* * * * *